P. & B. DE MATTIA.
TIRE BUILDING CORE.
APPLICATION FILED APR. 25, 1917.
1,249,040.
Patented Dec. 4, 1917.
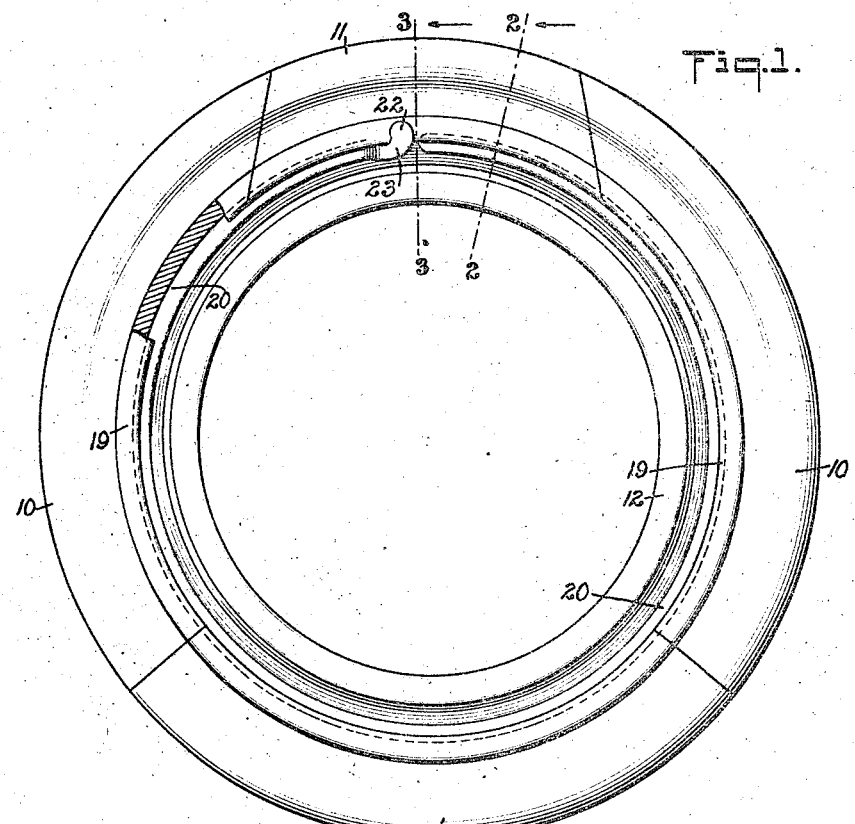
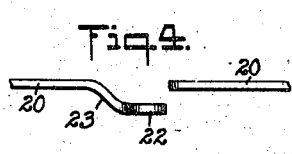
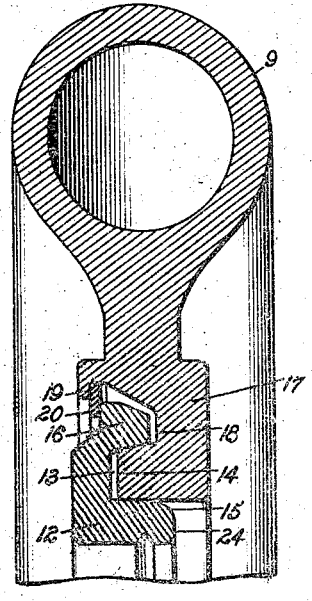
WITNESSES
INVENTORS
Peter De Mattia
Barthold De Mattia
BY
ATTORNEYS

UNITED STATES PATENT OFFICE.

PETER DE MATTIA AND BARTHOLD DE MATTIA, OF CLIFTON, NEW JERSEY.

TIRE-BUILDING CORE.

1,249,040.   Specification of Letters Patent.   Patented Dec. 4, 1917.

Application filed April 25, 1917. Serial No. 164,395.

*To all whom it may concern:*

Be it known that we, PETER DE MATTIA and BARTHOLD DE MATTIA, both citizens of the United States, and residents of Clifton, in the county of Passaic and State of New Jersey, have invented a new and Improved Tire-Building Core, of which the following is a full, clear, and exact description.

Among the principal objects which the present invention has in view are: to lock the separable sections of a core of the character described in alinement; to reduce the time factor required for setting up a core; and to simplify the operation of setting up and knocking down said core.

Drawings.

Figure 1 is a side view of a core of the character mentioned having applied thereto an alining ring and lock therefor constructed and arranged in accordance with the present invention;

Fig. 2 is a cross section on an enlarged scale, the section being taken as on the line 2—2 in Fig. 1;

Fig. 3 is a similar section, the section being taken as on the line 3—3 in Fig. 1;

Fig. 4 is a detail view showing two end fragments of a locking ring employed in the present invention.

Description.

As seen in the drawings, the core comprises a body section 9, two lateral sections 10, and a key section 11. The key section 11 has wedge-shaped ends flared toward the center of the core. After a tire has been cured on the core formed by the sections 9, 10 and 11, the said core is removed and it is to facilitate this operation that the key section 11 is so shaped that it may be drawn out of the tire through the inner annular gap thereof. It is obvious that when the key section 11 is removed, the lateral sections 10 and the body section 9 may be quickly taken from the interior of the tire.

To aline the various sections and avoid creasing or ridging the interior of the tire, a solid ring 12 is provided. The ring 12 has an annular groove 13 provided to hold the flanges 14 on the various sections 9, 10 and 11. When the said sections are properly assembled, the flanges 14 form a continuous annular flange to accurately fit the groove 13. The flanges 14 are slightly wedge-shaped in cross section, and the sides of the groove 13 are correspondingly pitched. Adjacent the entrance to the groove 13 and at the inner edge thereof the ring 12 is chamfered to form an inclined surface 15. The surface 15 operates as a guide over which the edges of the flanges 14 are forced when obtaining access to the groove 13.

The inner wall of the outer flange 16 of the ring 12 is inclined in correspondence with the outer wall of the flanges 14, to fix the limits of the outer extension of each of the sections 9, 10 and 11.

To receive the flange 16 of the ring 12, the necks 17 with which the sections 9, 10 and 11 are provided, have each a groove 18. At the opening side of the groove 18, a slightly overhanging flange 19 is formed for holding in service a locking ring 20. Between the inner edge of the flanges 19 of the core sections and the opposite side of the grooves 18, sufficient room is provided for the passage of the flange 16 of the ring 12. When the ring 12 is set, the back 21 of the flange 16 is separated from the inner face of the flange 19 to receive tightly the ring 20. The ring 20 is constructed from resilient material and is split, one end having a wedging lug 22. The lug 22 rests at the outside of the flange 19 when the ring 20 is disposed in service. Said lug and the adjacent portion of the ring are connected by a curved section 23.

Operation.

When constructed and arranged in accordance with the present invention, the core sections 9, 10 and 11 are assembled to receive the ring 12. The ring 12 is superposed on the necks 17, the chamfered surface 15 of the said ring resting on the inner edges of the flanges 14. The core sections being properly supported, the ring 12 is then tamped or otherwise forced to its service position where the flanges 14 enter the groove 13 of said ring. It is obvious that if the inner edges of the flanges 14 are not alined, the operation of the chamfered surface 15 will move them into alinement. If, on the other hand, any of the sections are extended outward, the inclination of the outer surface of the groove 13 operating on the outer surface of the flanges 14, will draw the said core sections backward into perfect alinement.

The ring 12 is thus forced home until the ring 20 can pass between the inner surface of the flange 19 and the back 21 of the flange 16. The operation of placing the ring 20 is similar to the placement of the locking ring usually employed in mounting a demountable tire rim.

When the ring 20 is completely set, it will be found that the lug 22 rests as shown in Figs. 1 and 2 of the drawings, engaging the exposed surface of the flange 19.

After the tire has been cured and it becomes necessary to remove the core, the initial operation consists in removing the ring 20. To this end, a suitable tool is disposed behind the lug 22 and the end of the ring 20 adjacent thereto is withdrawn from between the flanges 16 and 19. After the ring 20 is removed, it is obvious that it is a simple matter to remove the ring 12 from engagement with the sections 9, 10 and 11. This is accomplished most readily by driving the ring from engagement with the groove 18, the striking surface 24 being provided therefor.

Claims.

1. A tire building core comprising a plurality of core sections, each provided with a setting flange, said flanges being tapered in cross section; a continuous alining ring having a continuous annular groove, said groove being shaped in correspondence with said flanges; and means for holding said ring and said flanges in service relation, said means embodying a flange disposed in spaced relation to the back of said ring in service, and a wedging member adapted to rest between said flange and the back of said ring.

2. A tire building core comprising a plurality of core sections, each provided with a setting flange, said flanges being tapered in cross section; a continuous alining ring having a continuous annular groove, said groove being shaped in correspondence with said flanges; and means for holding said ring and said flanges in service relation, said means embodying a plurality of overhanging members, one formed on each of said sections, said members being disposed in spaced relation to said ring when in service, and a split ring adapted for disposition between said members and said alining ring.

3. A tire building core comprising a plurality of core sections, each provided with a setting flange, said flanges being tapered in cross section; a continuous alining ring having a continuous annular groove, said groove being shaped in correspondence with said flanges; means for holding said ring and said flanges in service relation, said means embodying a plurality of overhanging members, one formed on each of said sections, said members being disposed in spaced relation to said ring when in service, and a split ring adapted for disposition between said members and said alining ring; and means for at will removing said split ring, said means embodying a wedging lug formed at the end of said spring for the dislodgment thereof from between said overhanging members and said alining ring.

4. A tire building core comprising a plurality of core sections having inwardly extending necks, said necks being provided with tapered groove sections, said groove sections being adapted for alinement for forming a continuous circular groove; a rigid ring shaped in cross section in correspondence with said sections, said ring embodying a chamfered surface adjacent the edge thereof for assembling said core sections, said chamfered surface being adjacent a striking surface formed on said ring; a series of overhanging members, one on each of said sections, said overhanging members being disposed adjacent the open edge of the grooves in said sections; and an expansible locking ring adapted for insertion between said rigid ring and said members for holding said rigid ring in service relation to said core sections.

PETER DE MATTIA.
BARTHOLD DE MATTIA.